(12) United States Patent
Kiyosawa

(10) Patent No.: US 11,002,348 B2
(45) Date of Patent: May 11, 2021

(54) ROTARY ACTUATOR AND LINEAR ACTUATOR

(71) Applicant: HARMONIC DRIVE SYSTEMS INC., Tokyo (JP)

(72) Inventor: Yoshihide Kiyosawa, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 88 days.

(21) Appl. No.: 16/607,757

(22) PCT Filed: Jun. 21, 2017

(86) PCT No.: PCT/JP2017/022926
§ 371 (c)(1),
(2) Date: Oct. 24, 2019

(87) PCT Pub. No.: WO2018/235212
PCT Pub. Date: Dec. 27, 2018

(65) Prior Publication Data
US 2020/0049237 A1     Feb. 13, 2020

(51) Int. Cl.
*F16H 25/20*     (2006.01)
*F16D 3/06*     (2006.01)
*F16H 49/00*     (2006.01)

(52) U.S. Cl.
CPC ............... *F16H 25/20* (2013.01); *F16D 3/06* (2013.01); *F16H 49/001* (2013.01); *F16H 2025/2075* (2013.01); *F16H 2025/2087* (2013.01)

(58) Field of Classification Search
CPC ............ F16H 25/20; F16H 49/001; F16H 2025/2075; F16H 2025/2087; F16D 3/06
See application file for complete search history.

(56) References Cited

U.S. PATENT DOCUMENTS 5,919,109 A * 7/1999 Fleckenstein ........ B60K 17/046
                                              475/151
6,053,841 A     4/2000   Koide et al.
(Continued)

FOREIGN PATENT DOCUMENTS

JP     S63062934 A     3/1988
JP     H10148245 A     6/1998
(Continued)

OTHER PUBLICATIONS

International Search Report (PCT/ISA/210) and translation and Written Opinion (PCT/ISA/237) dated Aug. 1, 2017, by the Japanese Patent Office as the International Searching Authority for International Application No. PCT/JP2017/022926.

*Primary Examiner* — Zakaria Elahmadi
(74) *Attorney, Agent, or Firm* — Buchanan Ingersoll & Rooney PC

(57) ABSTRACT

A rotary actuator has a hollow motor and hollow reduction gears arranged coaxially on either side of the hollow motor. A rotary shaft is arranged so as to pass through a hollow motor shaft of the hollow motor. The hollow reduction gears have hollow input shafts connected to the shaft ends on either sides of the hollow motor shaft. The hollow reduction gears have hollow output shafts connected to sections of the rotary shaft protruding from both ends of the hollow motor shaft. The connection position of the hollow output shaft with respect to the rotary shaft can be adjusted in the rotational direction. A load is rotationally driven by the rotary shaft. By increasing the axial length of the hollow motor, it is possible to obtain a small-diameter rotary actuator having a rotational output with large torque.

6 Claims, 3 Drawing Sheets

(56) References Cited

U.S. PATENT DOCUMENTS

| | | | |
|---|---|---|---|
| 2002/0026852 A1* | 3/2002 | Kiyosawa | F16H 49/001 |
| | | | 74/640 |
| 2007/0281824 A1* | 12/2007 | Tezuka | G01D 5/04 |
| | | | 475/331 |
| 2008/0026901 A1* | 1/2008 | Kiyosawa | F16H 3/70 |
| | | | 475/325 |
| 2008/0098839 A1* | 5/2008 | Maruyama | H02K 7/116 |
| 2009/0031852 A1* | 2/2009 | Yamamori | B62D 5/008 |
| | | | 74/650 |
| 2009/0062053 A1* | 3/2009 | Kobayashi | F16H 49/001 |
| | | | 475/166 |
| 2018/0034348 A1* | 2/2018 | Li | H02K 7/116 |
| 2018/0172080 A1* | 6/2018 | Jackowski | F16D 7/025 |
| 2018/0283076 A1* | 10/2018 | Gorosin | E05F 15/622 |

FOREIGN PATENT DOCUMENTS

| | | |
|---|---|---|
| JP | H1191382 A | 4/1999 |
| JP | 2007321879 A | 12/2007 |
| JP | 4833028 B2 | 12/2011 |
| WO | 2005046030 A1 | 5/2005 |

\* cited by examiner

ROTARY ACTUATOR AND LINEAR ACTUATOR

TECHNICAL FIELD

The present invention relates to a rotary actuator and a linear actuator, each having two hollow reduction gears driven by one hollow motor.

BACKGROUND ART

An actuator such as a rotary actuator generally has a configuration in which one reduction gear is connected to one motor. A rotary actuator using a strain wave gearing as a reduction gear is proposed in Patent documents 1 and 2. A reduction gear unit disclosed in Patent document 1 has a structure in which one motor and one cup-type strain wave reduction gear are connected in tandem. An actuator disclosed in Patent document 2 has a structure in which one hollow motor and one silk hat-type strain wave reduction gear are connected in tandem.

PRIOR ART DOCUMENTS

Patent Documents

Patent document 1: JP 2007-321879 A
Patent document 2: JP 4833028 B

SUMMARY OF THE INVENTION

Problems to be Solved by the Invention

Here, the generated torque of a motor can be easily increased by increasing the axial length even if the diameter is the same. In contrast, a reduction gear has a limit in increasing the transmission torque in a case in which only the axial length is increased without increasing the outer diameter. For this reason, in an actuator provided with a motor and a reduction gear, it is not easy to increase the generated torque without increasing the outer diameter.

An object of the present invention is to provide a rotary actuator capable of easily increasing a torque while having a small diameter. Another object of the present invention is to provide a linear actuator capable of easily increasing a thrust while having a small diameter.

Means of Solving the Problems

In a rotary actuator of the present invention, hollow reduction gears are coaxially arranged on both sides of a hollow motor. A rotary shaft is arranged to penetrate a hollow part of a hollow motor shaft of the hollow motor. Hollow input shafts of the hollow reduction gears are respectively connected to both ends of the hollow motor shaft. Hollow output shafts of the hollow reduction gears are respectively connected, via connection mechanisms, to both ends of the rotary shaft extending to penetrate the hollow part of the hollow motor. At least one of the connection mechanisms has a structure in which a connection position of the hollow output shaft to the rotary shaft can be adjusted in a rotational direction.

According to the present invention, in a case in which the axial length of the hollow motor is increased to increase the generated torque, an increase in the generated torque can be easily obtained by increasing the axial length of each of the two hollow reduction gears on both sides of the hollow motor. Thus, by increasing the axial length of the actuator without increasing the outer diameter thereof, a small-diameter rotary actuator capable of generating a larger torque than a conventional rotary actuator having the same outer diameter can be easily realized. A large-torque rotary actuator can be installed in an elongated space having a restriction in a radial direction in which it cannot be installed until now.

Further, misalignment in rotational position between the output shafts of the two hollow reduction gears can be adjusted by the connection mechanism. It is therefore easily avoided an adverse effect caused by the misalignment in rotational position between two hollow reduction gears assembled to one hollow motor. Such a connection mechanism can be realized by, for example, bolt fastening using a slotted hole, fastening by a friction joint or the like.

Here, when a strain wave gearing called as a ring type or a flat type is used as the hollow reduction gear, a large hollow part can be easily secured, and a large-diameter hollow motor shaft can be arranged. When a strain wave gearing is used, a rotation error of the soft windup region, a difference in torsional rigidity, and the like are absorbed, whereby the mutual interference between the two hollow reduction gears is suppressed, and an output which is almost twice as much as that of the existing rotary actuator having the same outer diameter can be obtained.

The present invention is equally applicable to a linear actuator. In a linear actuator according to the present invention, hollow reduction gears are coaxially arranged on both sides of a hollow motor. A linear-motion-type screw shaft is arranged to penetrate a hollow part of the hollow motor shaft of the hollow motor. Hollow input shafts of the hollow reduction gears are respectively connected to both ends of the hollow motor shaft. The hollow output shaft of each of the hollow reduction gears is connected to each of two nuts which are screwed into the screw shaft. A connection mechanism, which connects the hollow output shaft of at least one of the hollow reduction gears to the nut, has a structure capable of adjusting the connection position of the hollow output shaft with respect to the nut in the rotational direction.

According to the present invention, when the axial length of the hollow motor is increased to increase the generated torque, an increase in generated torque can be easily obtained by increasing the axial length of each of the two hollow reduction gears on both sides of the hollow motor. By increasing an axial length of an actuator without accompanying an increase in the outer diameter thereof, a small-diameter linear actuator capable of generating a large thrust can be easily realized in comparison with a conventional linear actuator having the same outer diameter.

MODE FOR CARRYING OUT THE INVENTION

First Embodiment

Figure 1:
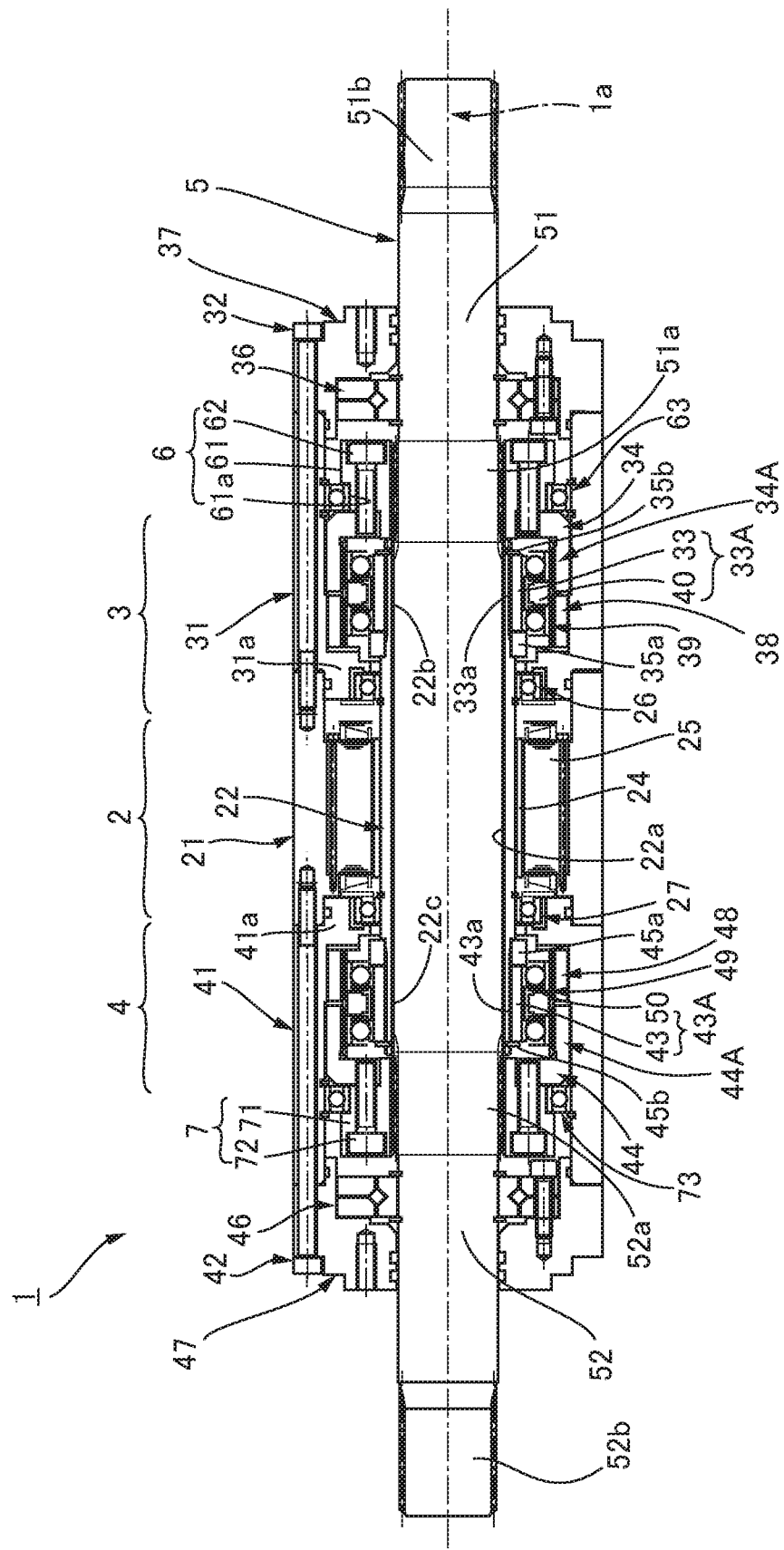
FIG. 1 is a schematic longitudinal cross-sectional view illustrating a rotary actuator of a first Embodiment according to the present invention.

FIG. 1 is a schematic longitudinal cross-sectional view illustrating a rotary actuator according to a first Embodiment. A rotary actuator 1 has one hollow motor 2; two hollow reduction gears 3 and 4 having the same reduction ratio; and one rotary shaft 5. The hollow reduction gears 3 and 4 sandwich the hollow motor 2 and are coaxially arranged on both sides thereof in the direction of a center axis line 1a. The rotary shaft 5 is arranged to coaxially penetrate the center portions of the hollow motor 2 and the hollow reduction gears 3 and 4 on both sides of the hollow motor. The hollow reduction gears 3 and 4 of this Embodiment are the same reduction gears and are arranged in a laterally symmetrical state with the hollow motor 2 as a center. Hollow reduction gears having a different size or structure may be used as the hollow reduction gears 3 and 4.

The hollow motor 2 is provided with a cylindrical motor housing 21 and a hollow motor shaft 22 coaxially arranged inside the motor housing. The hollow motor shaft 22 has a circular inner peripheral surface 22a that defines a motor hollow part extending to penetrate the hollow motor 2 in the direction of the center axis line 1a. The rotary shaft 5 coaxially extends to penetrate the motor hollow part, namely, the inside of the hollow motor shaft 22. A motor rotor having a cylindrical drive magnet 24 is assembled on the outer peripheral surface of the hollow motor shaft 22. A motor stator having a drive coil 25 is assembled on the inner peripheral surface of the motor housing 21.

The hollow motor shaft 22 is supported in a rotatable state at positions on both sides of the drive magnet 24 and the drive coil 25 by disc-shaped flanges 31a and 41a via ball bearings 26 and 27. The hollow motor shaft 22 has shaft end parts 22b and 22c on both sides thereof, the shaft end parts protruding to pass through the flanges 31a and 41a and extend toward the sides of the hollow reduction gears 3 and 4, respectively. The flanges 31a and 41a are respectively integrally formed with cylindrical reduction gear housing 31 and 41 of the hollow reduction gears 3 and 4. The reduction gear housings 31 and 41 have the same outer diameter as that of the motor housing 21 and are coaxially fastened and fixed to the motor housing 21 by a plurality of fastening bolts 32 and 42.

The hollow reduction gears 3 and 4 are the identical hollow reduction gears. The hollow reduction gear 3 is provided with a hollow input shaft 33 and a hollow output shaft 34. The hollow input shaft 33 and the hollow output shaft 34 are coaxially arranged inside the reduction gear housing 31. The hollow input shaft 33 has a circular inner peripheral surface 33a that defines a reduction gear hollow part extending to penetrate the hollow reduction gear 3 in the direction of the center axis line 1a.

The shaft end part 22b of the hollow motor shaft 22 coaxially extends to penetrate the inside of the reduction gear hollow part, namely, the inside of the hollow input shaft 33. In this example, the hollow input shaft 33 has a circular inner peripheral surface 33a which is a spline hole, and the shaft end part 22b is a spline shaft. The hollow input shaft 33 is coaxially connected to the shaft end part 22b of the hollow motor shaft 22 by a spline coupling. The movement of the hollow input shaft 33 in the direction of the center axis line 1a is restricted by a fixing ring 35a and a retaining ring 35b.

The hollow output shaft 34 of the hollow reduction gear 3 is coaxially connected to one shaft end portion 51 of the rotary shaft 5 via a connection mechanism 6, the shaft end portion protruding from one end of the hollow motor shaft 22. The connection mechanism 6 is provided with a cylindrical member 61 and a plurality of fastening bolts 62 by which the cylindrical member 61 is fastened and fixed to the hollow output shaft 34. The cylindrical member 61 is supported in a rotatable state by the reduction gear housing 31 via a ball bearing 63.

The cylindrical member 61 has a circular inner peripheral surface forming a spline hole, and the shaft portion 51 of the rotary shaft 5 has a section protruding from an end of the hollow motor shaft 22 where a spline-shaft portion 51a is formed. The cylindrical member 61 is coaxially connected to the shaft portion 51 of the rotary body 5 by a spline coupling.

The shaft portion 51 of the rotary shaft 5 is supported in a rotatable state by a disc-shaped end plate 37 via a bearing, for example, a crossed roller bearing 36 at a location outside of the spline-shaft portion 51a in the direction of the center axis line 1a. The end plate 37 has the same outer diameter as that of the reduction gear housing 31 and is coaxially fastened and fixed to the reduction gear housing 31 by a plurality of fastening bolts 32. In this embodiment, the shaft end portion 51b of the shaft portion 51 protrudes outward from the end plate 37 by a predetermined length. A load-side member (not shown) can be connected to the shaft end portion 51b.

The connection mechanism 6, which connects the hollow output shaft 34 of the hollow reduction gear 3 to the shaft portion 51 of the rotary shaft 5, is provided with an adjustment part capable of adjusting the connection position of the hollow output shaft 34 with respect to the rotary shaft 5 by a predetermined angle in the rotational direction of the hollow output shaft 34. The adjustment part of this embodiment is bolt through-holes 61a of the fastening bolts 62 formed in the cylindrical member 61. The bolt through-holes 61a are a slotted hole through which the fastening bolt 62 is inserted in a state having a play in the rotational direction. A connection mechanism 7, which connects a hollow output shaft 44 of a later-described hollow reduction gear 4 to the other shaft portion 52 of the rotary shaft 5, can be constituted in a similar manner.

The hollow reduction gear 3 of this embodiment is a strain wave gearing called as a ring type or a flat type. The hollow reduction gear 3 is provided with a cylindrical, rigid stationary-side internally toothed gear 38 and a cylindrical, rigid driven-side internally toothed gear 34A. A cylindrical, flexible externally toothed gear 39 is capable of meshing with the stationary-side internally toothed gear 38 and the driven-side internally toothed gear 34A and is coaxially arranged inside these gears. A wave generator 33A is fitted into the externally toothed gear 39.

The wave generator 33A is constituted by the hollow input shaft 33 and a wave-generator bearing 40 mounted between the outer peripheral surface of the hollow input shaft and the externally toothed gear 39. The outer peripheral surface of the hollow input shaft 33 is a non-circular outer peripheral surface and is an elliptical outer peripheral surface in this example. The externally toothed gear 39 is flexed into an elliptical shape by the wave generator 33A to partially mesh with both the stationary-side internally toothed gear 38 and the driven-side internally toothed gear 34A. The driven-side internally toothed gear 34A is integrally formed with the hollow output shaft 34.

Next, the other hollow reduction gear 4 is provided with a hollow input shaft 43 and a hollow output shaft 44. The hollow input shaft 43 has a circular inner peripheral surface 43a that defines a reduction-gear hollow part extending to penetrate the hollow reduction gear 4 in the direction of the center axis line 1a. The hollow motor shaft 22 has the other shaft end part 22c that coaxially extends to pass through the inside of the hollow input shaft 43. The hollow input shaft 43 has a circular inner peripheral surface 43a forming a spline hole, and the shaft end part 22c is a spline shaft. The hollow input shaft 43 is coaxially connected to the shaft end part 22c of the hollow motor shaft 22 by a spline coupling. The hollow input shaft 43 is restricted from moving in the direction of the center axis line 1a by means of a fixing ring 45a and a retaining ring 45b.

The hollow output shaft 44 is coaxially connected to the other shaft portion 52 of the rotary shaft 5 via a connection mechanism 7, the shaft portion protruding from the other end of the hollow motor shaft 22. The connection mechanism 7 is provided with a cylindrical member 71 and a plurality of fastening bolts 72 by which the cylindrical member 71 is fastened and fixed to the hollow output shaft 44. The cylindrical member 71 is supported in a rotatable state by the reduction gear housing 31 via a ball bearing 73. The cylindrical member 71 has a circular inner peripheral surface forming a spline hole, and the shaft portion 52 of the rotary shaft 5 has a section protruding from an end of the hollow motor shaft 22 where a spline shaft portion 52a is formed. The cylindrical member 71 is coaxially connected to the shaft portion 52 of the rotary body 5 by a spline coupling.

The shaft portion 52 of the rotary shaft 5 is supported in a rotatable state by a disc-shaped endplate 47 via a bearing, for example, a crossed roller bearing 46 at a location outside of the spline shaft portion 52a in the direction of the center axis line 1a. The endplate 47 has the same outer diameter as that of the reduction gear housing 41 and is coaxially fastened and fixed to the reduction gear housing 41 by a plurality of fastening bolts 42. The shaft end portion 52b of the shaft portion 52 protrudes outward from the end plate 47 by a predetermined length. A load-side member (not shown) can be connected to the shaft end portion 52b.

The hollow reduction gear 4 is a strain wave gearing and is provided with a cylindrical, rigid stationary-side internally toothed gear 48 and a cylindrical, rigid driven-side internally toothed gear 44A. A cylindrical flexible externally toothed gear 49, which can be meshed with the stationary-side internally toothed gear 48 and the driven-side 44A, is coaxially arranged inside these gears. A wave generator 43A is fitted into the externally toothed gear 49.

The wave generator 43A is constituted by the hollow input shaft 43 and a wave-generator bearing 50 mounted between the outer peripheral surface of the hollow input shaft and the externally toothed gear 49. The outer peripheral surface of the hollow input shaft 43 is a non-circular outer peripheral surface and is an elliptical outer peripheral surface in this embodiment. The externally toothed gear 49 is flexed into an elliptical shape by the wave generator 43A to partially mesh with both the stationary-side internally toothed gear 48 and the driven-side internally toothed gear 44A. The driven-side internally toothed gear 44A of this embodiment is integrally formed with the hollow output shaft 44.

In the rotary actuator 1 of this embodiment, when the hollow motor 2 is driven to rotate, the output rotation thereof is transmitted to the hollow input shafts 33 and 43 of the hollow reduction gears 3 and 4 connected to the both ends of the hollow motor shaft 22, and is therefore transmitted to the wave generators 33A and 43A. In the hollow reduction gears 3 and 4, the speed of the input rotation is reduced at the same reduction ratio, and the reduced-speed rotation is outputted from the driven-side internally toothed gears 34A and 44A, or from the hollow output shafts 34 and 44. The rotary shaft 5 is driven to rotate by the reduced-speed rotation outputted from the hollow reduction gears 3 and 4.

The hollow reduction gears 3 and 4 and the connection mechanisms 6 and 7 are coaxially arranged on both sides of the hollow motor 2, and the rotary shaft 5 extends to pass through the hollow part formed in the center portions thereof. By increasing the axial length of the hollow motor 2, a rotary actuator can be realized which is capable of obtaining a rotational output having a large torque while having a small diameter.

Modified Example

Figure 2:
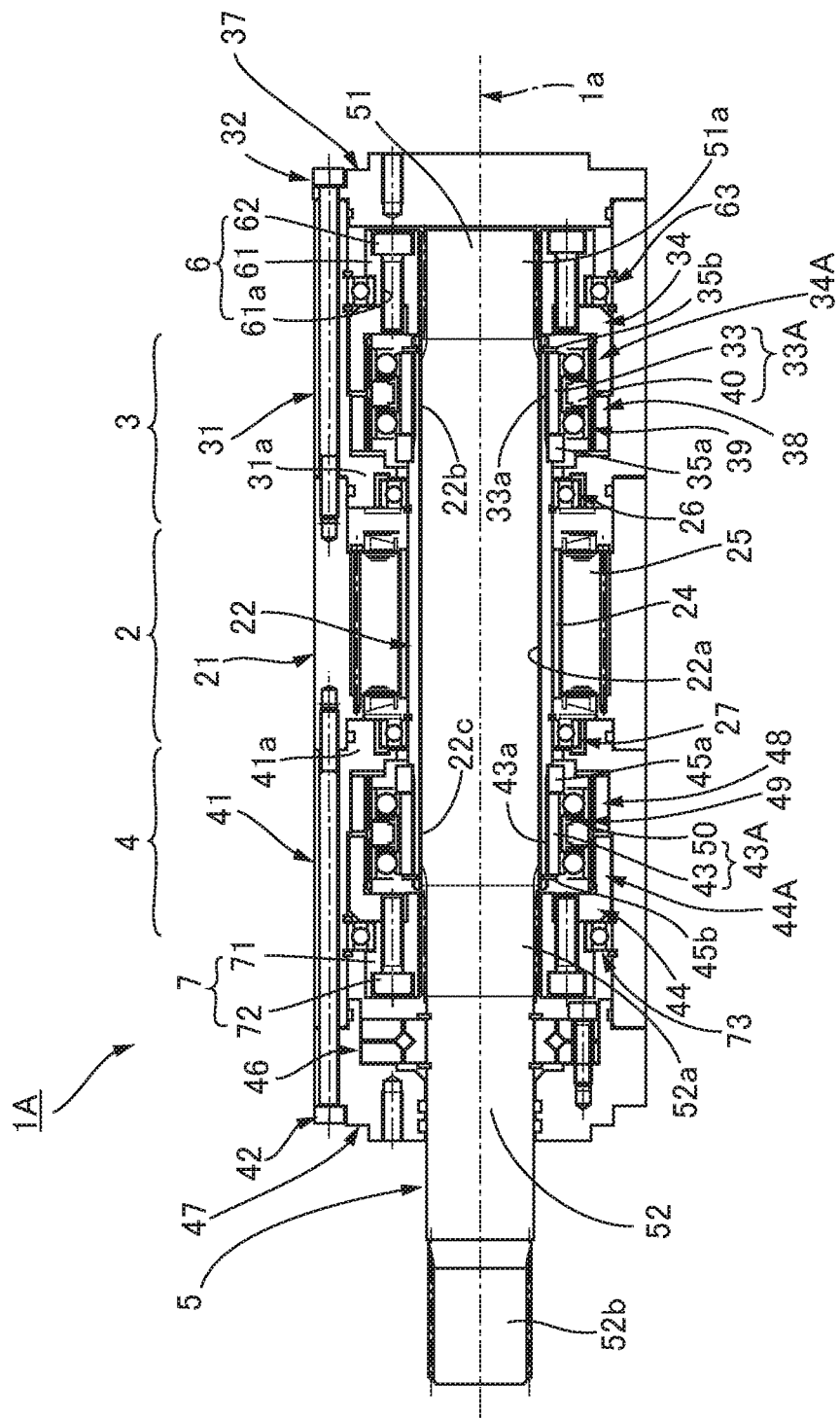
FIG. 2 is a schematic longitudinal cross-sectional view illustrating a modified example of the rotary actuator of FIG. 1.

In the rotary actuator 1 of this embodiment, the shaft end portions 51b and 52b on both ends of the rotary shaft 5 protrude from the end plates 37 and 47 on both sides. In other words, the rotary shaft 5 extends to penetrate the center part of the rotary actuator 1 in the direction of the center axis line 1a. For example, in a case in which rotational output is extracted from one side in the direction of the center axis line 1a, only one shaft end portion of the rotary shaft 5 is protruded from the end of the rotary actuator 1. In a rotary actuator 1A illustrated in FIG. 2, a shaft end portion 52b of one shaft portion 52 of a rotary shaft 5 protrudes from an end plate 47. The other shaft portion 51 of the rotary shaft 5 is arranged inside an end plate 37 without passing therethrough. A crossed roller bearing 36 for supporting the shaft portion 51 is also omitted. The remaining configuration of the rotary actuator 1A is the same as that of the rotary actuator 1.

Second Embodiment

Figure 3:
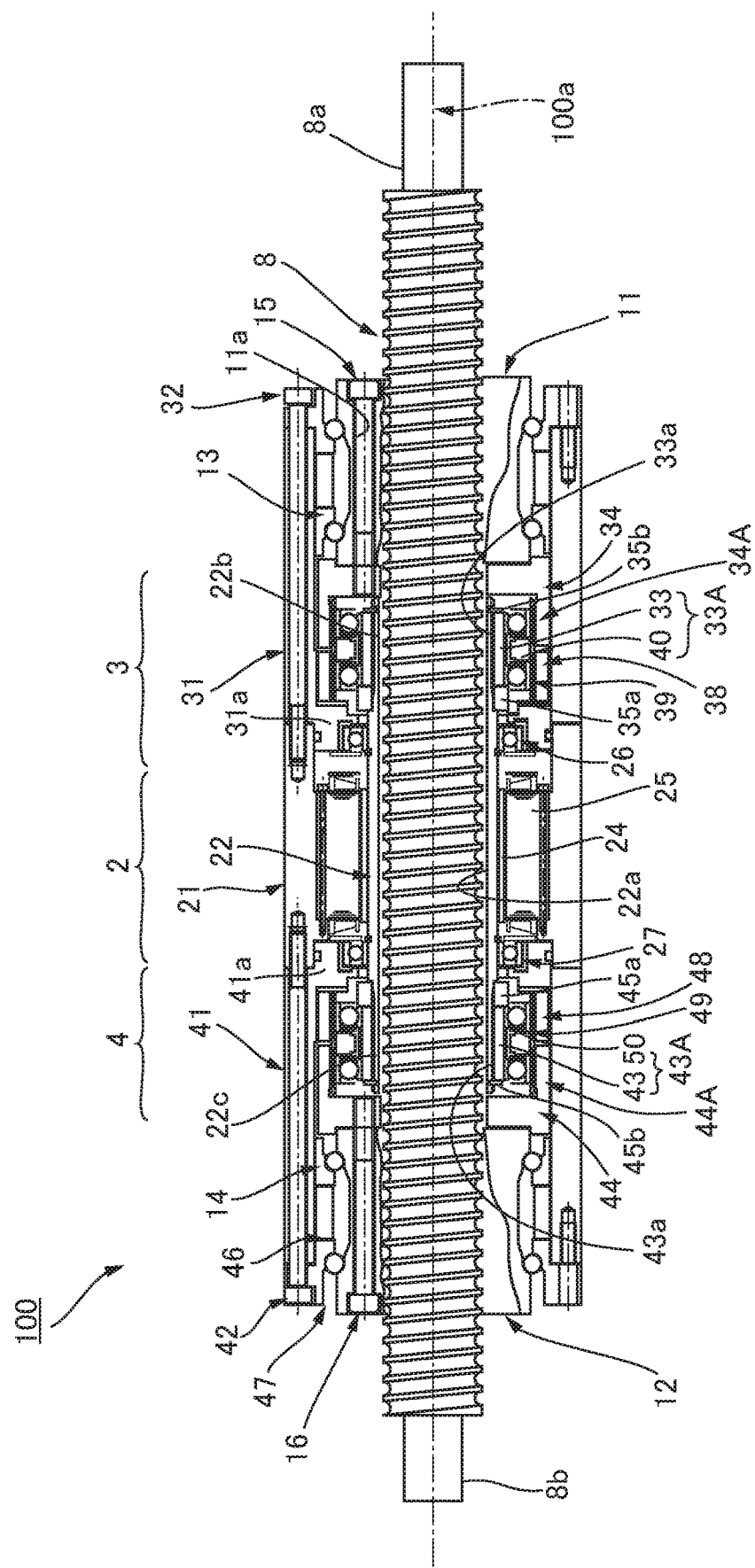
FIG. 3 is a schematic longitudinal cross-sectional view illustrating a linear actuator of a second Embodiment according to the present invention.

FIG. 3 is a schematic longitudinal cross-sectional view illustrating a linear actuator according to a second Embodiment. A linear actuator 100 has a configuration in which an output rotation of one hollow motor is reduced in speed by two hollow reduction gears to rotate two ball screw nuts so that a ball screw shaft is caused to move linearly. The hollow motor and two hollow reduction gears are the same as the hollow motor 2 and the hollow reduction gears 3 and 4, respectively, of the rotary actuator 1 of FIG. 1.

Referring to FIG. 3, a linear actuator 100 has one hollow motor 2, two hollow reduction gears 3 and 4 having the same reduction ratio, and a ball screw mechanism (rotation/linear-motion conversion unit) provided with a ball screw shaft 8 and two ball screw nuts 11 and 12. The hollow reduction gears 3 and 4 are coaxially arranged on both sides of the hollow motor 2 in the direction of the center axis line 100a in a manner sandwiching the hollow motor therebetween. The hollow reduction gears 3 and 4 of this embodiment are the identical reduction gears and are arranged in a laterally symmetrical state with respect to the hollow motor 2 as a center.

The ball screw shaft 8 extends to penetrate the motor hollow part and the reduction-gear hollow part. Specifically, the ball screw shaft 8 extends to coaxially pass through the inside of a hollow motor shaft 22 and hollow input shaft 33 and 43 of the hollow reduction gears 3 and 4. The ball screw nuts 11 and 12, which are screwed to the ball screw shaft 8, are arranged adjacent to and outside of the hollow reduction gears 3 and 4 in the direction of the center axis line 100a. The ball screw nuts 11 and 12 are supported in a rotatable state by reduction gear housings 31 and 41 via thrust ball bearings 13 and 14, for example, dual thrust angular ball bearings. The ball screw nuts 11 and 12 are exposed from opening ends of the reduction gear housings 31 and 41, and the ball screw shaft 8 has shaft end parts 8a and 8b on both sides thereof protruding outward from the ball screw nuts 11 and 12.

In the hollow reduction gears 3 and 4, the hollow input shafts 33 and 34 are coaxially connected by a spline coupling to the shaft end parts 22b and 22c of the hollow motor shaft 22, respectively. The hollow output shafts 34 and 44 of the hollow reduction gears 3 and 4 are coaxially connected to the ball screw nuts 11 and 12 by a plurality of fastening bolts 15 and 16 (connection mechanisms).

Here, the connection position of the hollow output shaft 34 to the ball screw nut 11 can be adjusted by a predetermined angle in the rotational direction of the hollow output shaft 34. The ball screw nut 11 is formed with bolt through-holes 11a of the fastening bolts 15 and the bolt through-holes are slotted holes into which the fastening bolts 15 can be inserted in a state having a predetermined play in the rotational direction. A connection mechanism for connecting the hollow output shaft 44 of the hollow reduction gear 4 with the ball screw nut 12 may be similarly configured.

In the linear actuator 100 of this embodiment, when the hollow motor 2 is driven to rotate, an output rotation therefrom is transmitted to the hollow input shafts 33 and 43 of the hollow reduction gears 3 and 4 connected to both ends of the hollow motor shaft 22, and therefore is transmitted to the wave generators 33A and 43A. The hollow reduction gears 3 and 4 reduce in speed of an input rotation at the same reduction ratio, and the obtained reduced-speed rotation is outputted from the driven-side internally toothed gears 34A and 44A, namely, from the hollow output shafts 34 and 44. The ball screw nuts 11 and 12 are respectively driven to rotate by the reduced-speed rotation outputted from the hollow reduction gears 3 and 4. The rotation of the ball screw nuts 11 and 12 causes to make the ball screw shaft 8 to move in the direction of the center axis line 100a.

The hollow reduction gears 3 and 4, the ball screw nuts 11 and 12 are coaxially arranged on both sides of the hollow motor 2, and the ball screw shaft 8 extends to pass through the hollow part formed by the center portions of these parts. An increase in the axial length of the hollow motor 2 can realize a linear actuator capable of generating a large thrust while having a small diameter.

The invention claimed is:

1. A rotary actuator comprising:
   one hollow motor;
   two hollow reduction gears having a same reduction ratio; and
   one rotary shaft,
   wherein the hollow reduction gears are coaxially arranged on both sides of the hollow motor in a direction of a center axis line to sandwich the hollow motor therebetween;
   the hollow motor has: a hollow motor shaft; and a motor hollow part that is defined by a hollow part of the hollow motor shaft and extends to penetrate the hollow motor in the direction of the center axis line;
   each of the hollow reduction gears has: a hollow input shaft; a hollow output shaft; and a reduction gear hollow part that is defined by a hollow part of the hollow input shaft and extends to penetrate the hollow reduction gear in the direction of the center axis line;
   the rotary shaft coaxially extends to penetrate the motor hollow part;
   the hollow input shafts of the hollow reduction gears are coaxially connected to shaft end parts on both sides of the hollow motor shaft, respectively;
   the rotary shaft has shaft portions on both sides thereof protruding from both ends of the motor hollow part, and the hollow output shafts of the hollow reduction gears are coaxially connected to the shaft portions via connection mechanisms; and
   at least one of the connection mechanisms has an adjustment part to adjust a connection position of the hollow output shaft to the rotary shaft by a predetermined angle in a rotational direction of the hollow output shaft.

2. The rotary actuator according to claim 1,
   wherein the hollow input shafts are connected, via spline coupling, to outer peripheral surfaces of the shaft end parts of the hollow motor shaft;
   each of the connection mechanism has: a cylindrical member connected to the outer peripheral surface of the hollow motor shaft via the spline coupling; and a fastening bolt by which the cylindrical member is fastened and fixed to the hollow output shaft; and
   the adjustment part of the connection mechanism is a bolt through-hole of the fastening bolt and is formed in the cylindrical body or the hollow output shaft, and the bolt through-hole is a slotted hole into which the fastening bolt is inserted in a state having a play in the rotational direction.

3. The rotary actuator according to claim 2,
   wherein each of the hollow reduction gears has a strain wave gearing that comprises:
   a cylindrical, rigid stationary-side internally toothed gear and a cylindrical, rigid driven-side internally toothed gear;
   a cylindrical, flexible externally toothed gear that is coaxially arranged inside the stationary-side internally toothed gear and the driven-side internally toothed gear and is capable of meshing with these gears; and
   a wave generator fitted into the externally toothed gear, and
   wherein the wave generator has the hollow input shaft having a non-circular outer peripheral surface; and
   the driven-side internally toothed gear is formed integrally with the hollow output shaft.

4. A linear actuator comprising:
   one hollow motor;
   two hollow reduction gears having a same reduction ratio; and
   a rotation/linear-motion conversion unit having one screw shaft and two nuts,
   wherein the hollow reduction gears are coaxially arranged on both sides in a direction of a center axis line to sandwich the hollow motor therebetween;
   the hollow motor has: a hollow motor shaft; and a motor hollow part that extends to penetrate the hollow motor in the direction of the center axis line and is defined by a hollow part of the hollow motor shaft;
   each of the hollow reduction gears has: a hollow input shaft; a hollow output shaft; and a reduction gear hollow part that extends to penetrate the hollow reduction gear in the direction of the center axis line and is defined by a hollow part of the hollow input shaft;
   the screw shaft coaxially extends to penetrate the motor hollow part;
   the hollow input shafts of the hollow reduction gears are coaxially connected to shaft end parts on both sides of the hollow motor shaft;
   the nuts are screwed on shaft portions on both sides of the screw shaft, the shaft portions protruding from both ends of the motor hollow part;
   the hollow output shafts of the hollow reduction gears are coaxially connected to the nuts via connection mechanisms; and at least one of the connection mechanisms has an adjustment part to adjust a connection position of the hollow output shaft to the nut by a predetermined angle in a rotational direction of the hollow output shaft.

5. The linear actuator according to claim 4,
wherein the hollow input shafts are connected, via spline coupling, to an outer peripheral surface of the shaft end parts of the hollow motor shaft;
each of the connection mechanisms has a fastening bolt by which the hollow output shaft is fastened and fixed to the nut; and
the adjustment part of the connection mechanism is a bolt through-hole of the fastening bolt and is formed in the nut or the hollow output shaft, and the bolt through-hole is a slotted hole into which the fastening bolt is inserted in a state having a play in the rotational direction.

6. The linear actuator according to claim 5,
wherein each of the hollow reduction gears has a strain wave gearing comprising:
a cylindrical, rigid stationary-side internally toothed gear and a cylindrical, rigid driven-side internally toothed gear;
a cylindrical, flexible externally toothed gear that is arranged coaxially inside the stationary-side internally toothed gear and the driven-side internally toothed gear and is capable of meshing with these gears;
a wave generator fitted into the externally toothed gear, and
wherein the wave generator has the hollow input shaft having a non-circular outer peripheral surface; and
the driven-side internally toothed gear is integrally formed with the hollow output shaft.

* * * * *